Patented Oct. 10, 1939

2,175,842

UNITED STATES PATENT OFFICE 2,175,842

PROCESS FOR THE MANUFACTURE OF HIGHLY ACETYLATED CELLULOSE

Pierre Koetschet, Lausanne, Switzerland, assignor to Societe des Usines Chimiques Rhone-Poulenc, Paris, France, a corporation of France No Drawing. Application July 7, 1937, Serial No. 152,377. In Great Britain July 23, 1936

11 Claims. (Cl. 260—227)

The present invention relates to the manufacture of cellulose acetate by the process of heterogeneous acetylation, namely, that in which the cellulose acetate obtained remains in a state of suspension in the reaction mixture.

Hitherto it has been very difficult to obtain cellulose acetates of high technical value by processes of this type. Most of the processes which have been described furnish, in practice, products the solution of which are of low viscosity and which give on evaporation of their solutions films lacking in suppleness, and which are even brittle.

Up to the present it has only been possible to avoid these defects by the addition of foreign substances such as sulphurous anhydride to the reaction mixture, the use of which and the recovery of which present great difficulties. The present invention, on the other hand, furnishes a process which enables very homogeneous products to be obtained giving supple films without the use of any foreign material being added to the usual reaction mixtures; by means of this process it is possible to prepare cellulose acetates of which the solutions, for example, in methylene chloride containing alcohol, are completely clear and very viscous, the viscosity being higher than that of any of the products previously described in the literature.

According to the present invention it has been found that such results can be obtained by using mixed catalysts consisting of perchloric and sulphuric acids themselves mixed in various proportions without the presence of any metallic salt whatever.

A surprising result of the use of these mixed catalysts is that the mixed catalyst is far more active than each of the two components alone, even though this is contrary to certain published statements.

For example, a mixture of 5 parts of perchloric acid and 1 part of sulphuric acid when used according to the present invention, is from two to three times as active as 10 parts of perchloric acid used alone, which means that products perfectly soluble in the usual mixture of methylene chloride and alcohol (90% methylene chloride and 10% alcohol by volume) are obtained in a half or a third (or in certain cases in an even much smaller fraction) of the time required by 10 parts of perchloric acid used alone.

Likewise it has been ascertained that the addition of quite small proportions of sulphuric acid when added to perchloric acid (e. g. 1 to 2%) increases the activity of the catalyst to almost as great an extent.

This latter feature is of very great importance owing to the fact that by the use of a mixed catalyst of this type there is produced a fibrous acetate which is perfectly stable after a simple washing with cold water, whereas the usual methods using sulphuric acid have the great disadvantage of needing a costly special treatment for removing the greater part of the sulpho-acetate which they contain and which is very injurious to their stability.

It has also been ascertained that the cellulose acetates obtained with increased ease according to the present invention give solutions in methylene chloride-alcohol mixture which are more viscous than those obtained with less facility by the use of simple catalysts.

It may also be noted that according to the present invention the cellulosic material is preferably treated with acetic acid previous to any acetylation, but that this "pretreatment" must be conducted in the absence of any mineral acid whatever.

All the previously known processes relating to the use of mixed catalyst (perchloric and sulphuric acids) in a heterogeneous medium, which do not need a pretreatment with mineral acids, used mixtures containing the salts of one or the other of the acids. According to the present invention it has been ascertained that in the presence of these salts one does not obtain the marked activation obtained when the acids are used alone.

The following examples illustrate how the invention may be carried out in practice, but it is understood that the invention is by no means limited to these examples. The parts are throughout by weight.

Example 1

100 parts of cellulose (bleached linters) are brought into contact with 100 parts of 100% acetic acid for 8 hours. There is then added at one time a mixture cooled to —9° C. of:

| | Parts |
|---|---|
| Acetic anhydride | 1700 |
| 100% acetic acid | 1800 |
| Ether | 430 |
| 60% sulphuric acid | 1 |
| 65% perchloric acid | 5 |

The mass is agitated until a sample, after removal and freeing by drainage from the greater part of the acetylating liquid, gives a perfectly clear solution in a mixture of 90% by volume of methylene chloride and 10% by volume of alcohol. This takes approximately 7½ hours (instead of 21 hours under the same conditions with 10 parts of 65% perchloric acid used alone). The product after filtration, washing and drying gives very clear and very viscous solutions.

Example 2

100 parts of cellulose (bleached linters) are brought into contact with 100 parts of 100% acetic acid for 8 hours. There is then added at one time a mixture cooled to −12° C. of:

| | Parts |
|---|---|
| Acetic anhydride | 2550 |
| 100% acetic acid | 950 |
| Ether | 430 |
| 60% sulphuric acid | 1 |
| 65% perchloric acid | 5 |

The mass is agitated until a sample after removal and freeing by drainage from the greater part of the acetylating liquid gives a perfectly clear solution in the above mentioned mixture of methylene chloride and alcohol. This takes approximately 5½ hours (instead of 94 hours under the same conditions with 10 parts of 65% perchloric acid used alone).

The product is then filtered, washed and dried. Its solutions are very clear and very viscous.

Example 3

100 parts of cellulose (bleached linters) are brought into contact with 100 parts of 100% acetic acid for 8 hours. There is then added at one time a mixture cooled to −14° C. of:

| | Parts |
|---|---|
| Acetic anhydride | 2550 |
| 100% acetic acid | 950 |
| Ether | 430 |
| 60% sulphuric acid | 0.2 |
| 65% perchloric acid | 10 |

The mass is agitated until a sample after removal and freeing by drainage from the greater part of the acetylating liquid gives a perfectly clear solution in the above mentioned mixture of methylene chloride and alcohol. This takes approximately 6 hours (instead of 94 hours under the same conditions with 10 parts of perchloric acid used alone).

The product obtained, after filtration, washing and drying gives very clear and very viscous solutions.

Example 4

100 parts of cellulose (bleached linters) are brought into contact with 100 parts of 100% acetic acid for 8 hours. There is then added at one time a mixture cooled to −14° C. of:

| | Parts |
|---|---|
| Acetic anhydride | 3400 |
| 100% acetic acid | 100 |
| Ether | 430 |
| 60% sulphuric acid | 0.2 |
| 65% perchloric acid | 10 |

The mass is agitated until a sample after removal and freeing by drainage from the greater part of the acetylating liquid, gives a perfectly clear solution in the above mentioned mixture of methylene chloride and alcohol. This takes approximately 48 hours. The product is then filtered, washed and dried.

Its solutions are very clear and much more viscous than those of any of the known products. For example a solution of 1 gram of acetate in 1 litre of the mixture of 90% methylene chloride and 10% alcohol of 95° (% volume) has at 25° C. a specific viscosity of 0.680 (determined by the relation $$\frac{n}{n_0} - 1$$

where $n$ is the viscosity of the solution and $n_0$ that of the solvent.

Example 5

100 parts of cellulose (bleached linters) are brought into contact with 100 parts of 100% acetic acid for 8 hours. There is then added at one time a mixture cooled to −12° C. of:

| | Parts |
|---|---|
| Acetic anhydride | 850 |
| 100% acetic acid | 850 |
| Ether | 215 |
| 60% sulphuric acid | 0.1 |
| 65% perchloric acid | 5 |

The mass is agitated until a sample, after removal and freeing by drainage from the greater part of the acetylating liquid gives a perfectly clear solution in the above mentioned mixture of methylene chloride and alcohol. This takes approximately 9½ hours. The product thus obtained, after filtration, washing and drying gives very clear and viscous solutions.

Example 6

100 parts of cellulose (bleached linters) are brought into contact with 100 parts of 100% acetic acid for 8 hours. There is then added at one time a mixture cooled to −10° C. of:

| | Parts |
|---|---|
| Acetic anhydride | 3000 |
| 100% acetic acid | 100 |
| Ethyl acetate | 900 |
| 60% sulphuric acid | 0.2 |
| 65% perchloric acid | 10 |

The mass is agitated until a sample, after removal and freeing by drainage from the greater part of the acetylating liquid, gives a perfectly clear solution in the above mentioned mixture of methylene chloride and alcohol. This takes approximately 1½ to 2 hours. The product thus obtained is filtered, washed and dried. It gives very clear and extremely viscous solutions.

Example 7

100 parts of cellulose (bleached linters) are brought into contact with 100 parts of 100% acetic acid for 8 hours. There is then added at one time a mixture cooled to −11° C. of:

| | Parts |
|---|---|
| Acetic anhydride | 3400 |
| 100% acetic acid | 100 |
| Benzene | 530 |
| 60% sulphuric acid | 0.2 |
| 65% perchloric acid | 10 |

The mass is agitated until a sample, after removal and freeing by drainage from the greater part of the acetylating liquid gives a perfectly clear solution in the above mentioned mixture of methylene chloride and alcohol. This takes approximately 1 hour. The product after filtration, washing and drying gives very clear and viscous solutions.

What I claim and desire to secure by Letters Patent is:

1. A process for the manufacture of fibrous cellulose acetates characterised by the feature that the cellulose is pretreated with acetic acid and then caused to react with an acetylating liquid consisting of a mixture of acetic anhydride, acetic acid, a substance which prevents the cellulose acetate from going into solution, hereafter called "non-solvent", and a catalyst free from metallic salt and which consists of a mixture of perchloric acid with between 2% and 20% of its weight of sulphuric acid.

2. A process for the manufacture of fibrous cellulose acetates characterised by the feature that the cellulose is caused to react with an acetylating liquid consisting of a mixture of acetic anhydride, acetic acid, a non-solvent and a catalyst free from metallic salt and which consists of a mixture of perchloric acid with between 2% and 5% of its weight of sulphuric acid.

3. A process for the manufacture of fibrous cellulose acetates characterised by the feature that the cellulose is pretreated with acetic acid and then caused to react with an acetylating liquid consisting of a mixture of acetic anhydride, acetic acid, a non-solvent and a catalyst free from metallic salt and which consists of a mixture of perchloric acid with between 2% and 5% of its weight of sulphuric acid.

4. A process for the manufacture of fibrous cellulose acetates characterised by the feature that the cellulose is caused to react with more than 15 times its weight of an acetylating liquid consisting of a mixture of acetic anhydride, acetic acid, a non-solvent and a catalyst free from metallic salt and which consists of a mixture of perchloric acid with between 2% and 20% of its weight of sulphuric acid, the proportion of non-solvent being only slightly greater than that which is just necessary to cause the acetate formed to be insoluble in the reaction mixture.

5. A process for the manufacture of fibrous cellulose acetates characterised by the feature that the cellulose is caused to react with more than 15 times its weight of an acetylating liquid consisting of a mixture of acetic anhydride, acetic acid, a non-solvent and a catalyst free from metallic salt and which consists of a mixture of perchloric acid with between 2% and 20% of its weight of sulphuric acid, the proportion of non-solvent being less than 25% of the weight of the acetylating mixture.

6. A process for the manufacture of fibrous cellulose acetates characterised by the feature that the cellulose is caused to react with an acetylating liquid consisting of a mixture of acetic anhydride, acetic acid, ether and a catalyst free from metallic salt and which consists of a mixture of perchloric acid with between 2% and 5% of its weight of sulphuric acid.

7. A process for the manufacture of fibrous cellulose acetates characterised by the feature that the cellulose is caused to react with an acetylating liquid consisting of a mixture of acetic anhydride, acetic acid, benzene and a catalyst free from metallic salt and which consists of a mixture of perchloric acid with between 2% and 20% of its weight of sulphuric acid.

8. A process for the manufacture of fibrous cellulose acetates characterised by the feature that the cellulose is caused to react with an acetylating liquid consisting of a mixture of acetic anhydride, acetic acid, benzene and a catalyst free from metallic salt and which consists of a mixture of perchloric acid with between 2% and 5% of its weight of sulphuric acid.

9. A process for the manufacture of fibrous cellulose acetate characterized by acetylating cellulose in the presence of a catalyst free from metallic salt and which consists of a mixture of perchloric acid with between 2% and 20% of sulphuric acid.

10. A process for the manufacture of fibrous cellulose acetate characterized by acetylating cellulose in a mixture of acetic anhydride, acetic acid and ether in the presence of a catalyst free from metallic salt and which consists of a mixture of perchloric acid with between 2% and 20% of sulphuric acid.

11. A process for the manufacture of fibrous cellulose acetates characterised by the feature that the cellulose is caused to react with an acetylating liquid consisting of a mixture of acetic anhydride, acetic acid, a non-solvent and a catalyst free from metallic salt and which consists of a mixture of perchloric acid with between 2% and 20% of its weight of sulphuric acid.

PIERRE KOETSCHET.